June 19, 1962   E. J. DAVID   3,039,246
SUPPOSITORY PACKAGE AND METHOD OF MAKING IT
Filed Aug. 6, 1959   3 Sheets-Sheet 3
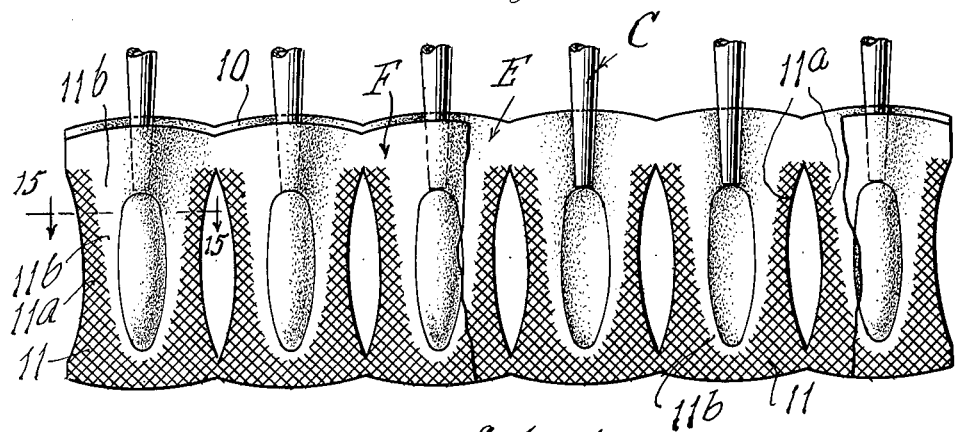
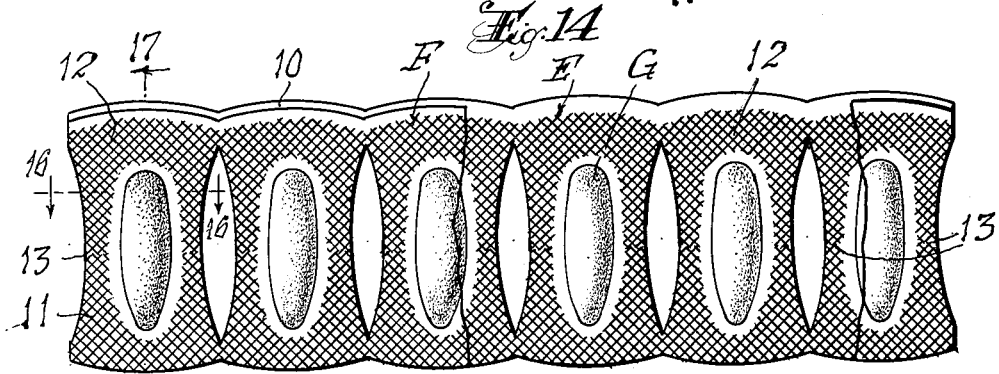
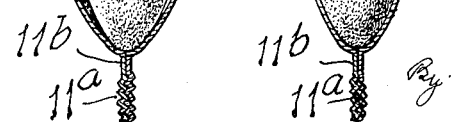
Inventor:
EDWARD J. DAVID
Harry B. Cook
Attorney

United States Patent Office 3,039,246
Patented June 19, 1962

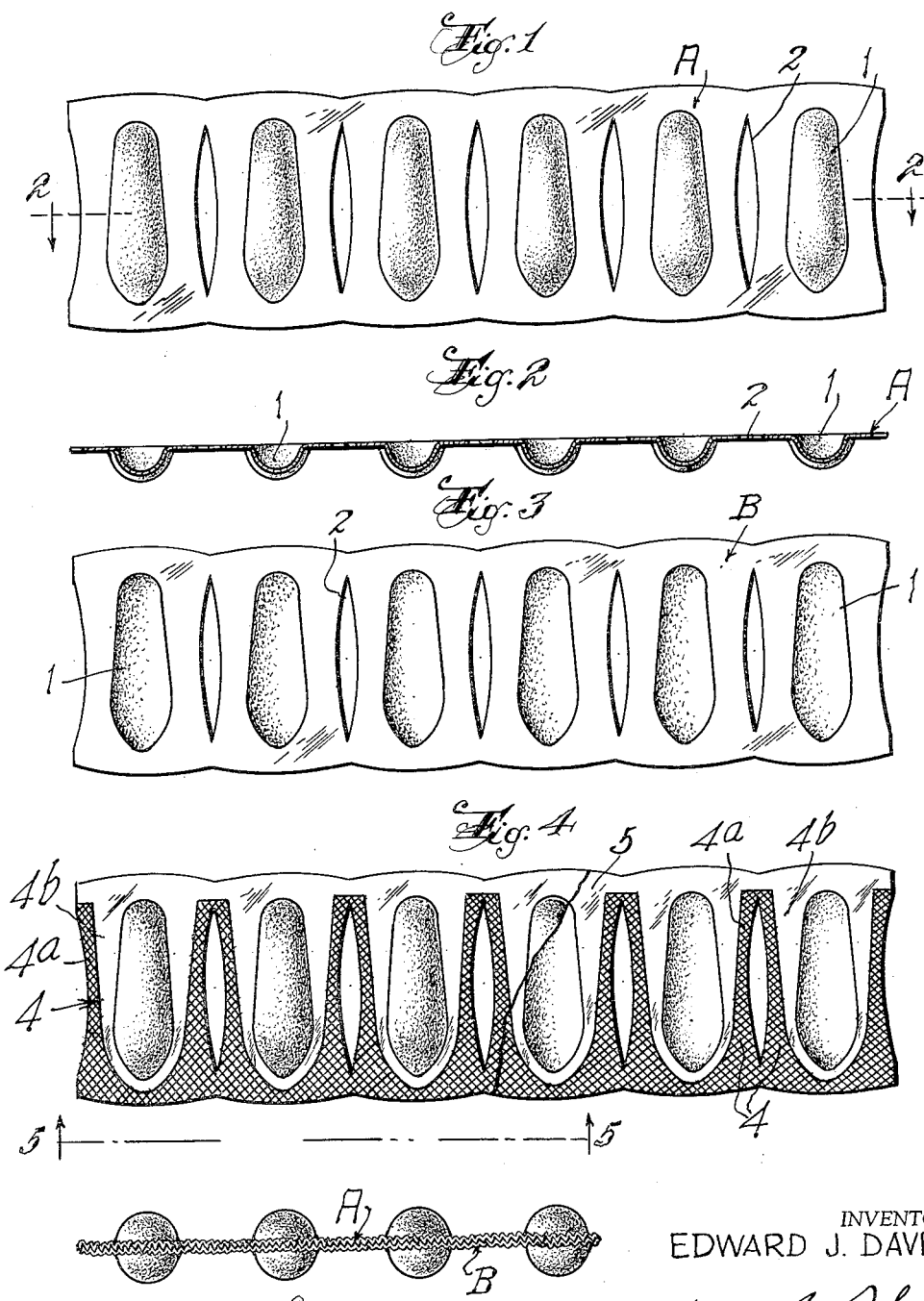

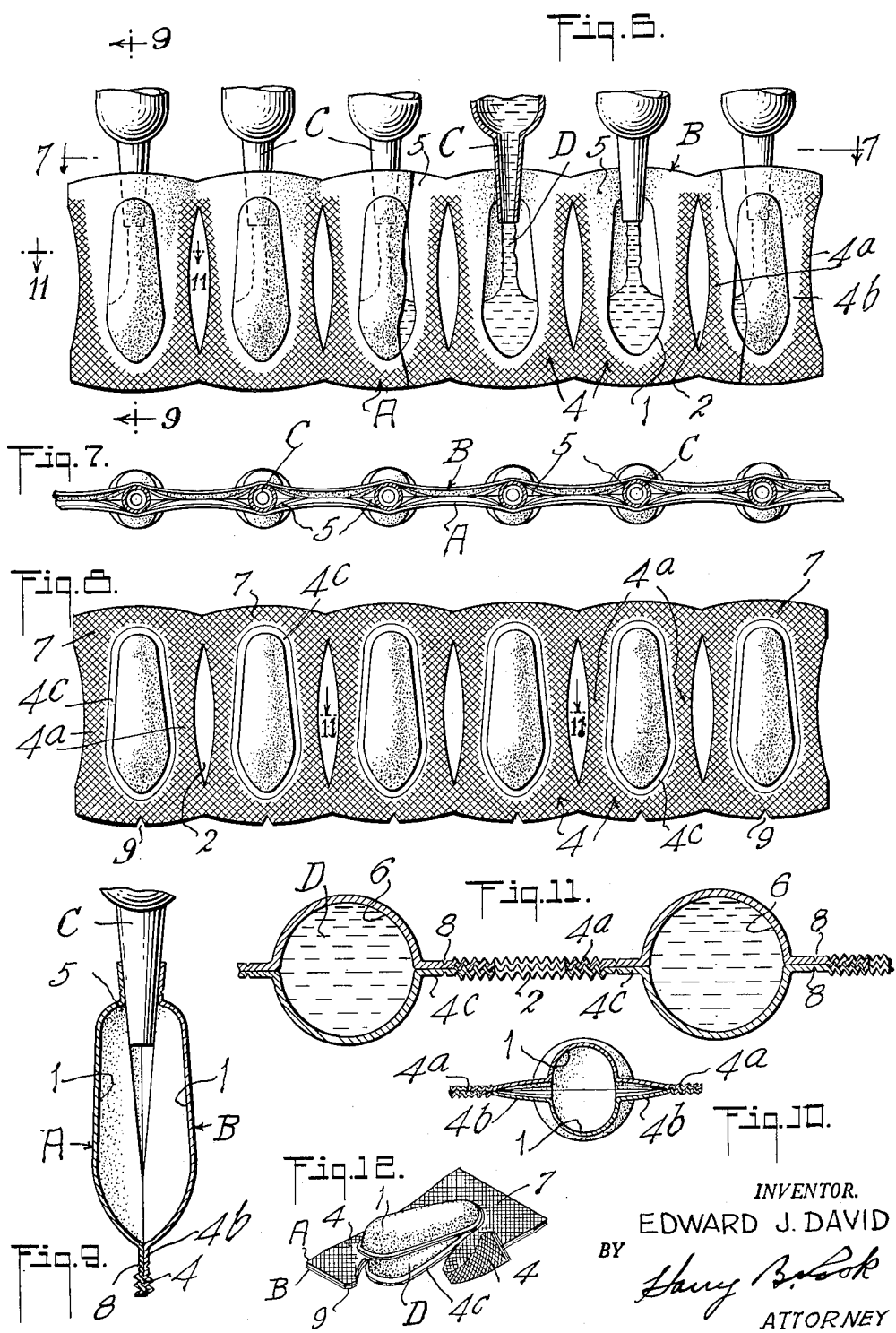

---

3,039,246
SUPPOSITORY PACKAGE AND METHOD OF MAKING IT
Edward J. David, Point Pleasant, N.J., assignor to Ivers-Lee Company, Newark, N.J., a corporation of Delaware
Filed Aug. 6, 1959, Ser. No. 832,029
3 Claims. (Cl. 53—29)

This invention relates in general to the art of packaging, particularly the packaging of materials that are initially fluent or capable of flowing and thereafter harden, and more especially the invention contemplates a package which includes opposed layers of relatively thin packaging material such as aluminum foil, sealed together in certain zones which form the boundaries of a compartment or chamber between said layers in which is deposited the material being packaged.

A primary object of the invention is to provide a novel and improved package of the character described and a novel and improved method of making such a package wherein two layers of the packaging material shall be initially sealed together to partially form a compartment between them having an open end through which the material being packaged is inserted into the compartment and thereafter the said layers shall be sealed together to close said open end, completing the compartment with the material therein, and the layers can thereafter be easily and quickly separated for removal of the material from the compartment.

Another object is to provide such a package and method of making it wherein the layers of material shall be formed and sealed together in a novel and improved manner so that the walls of the compartment can be easily and quickly pulled apart to permit easy removal of the material from the compartment.

Still another object is to provide a package and method of this character wherein the layers of the packaging material shall be heat sealed and interdigitated together to partially form the compartment having an open end and other portions of the layers shall be sealed without heat but with interdigitation so that the layers can be easily pulled apart with a peeling action when it is desired to remove the material from the compartment.

Still another object is to provide a novel method of producing a plurality of such packages in a continuous strip wherein the compartments of the packages are of irregular shape or of widely varying cross-sectional area at different points, for example of the shape of a suppository, said method including the steps of die forming each layer to form a plurality of recesses each complemental to the recess of another layer to form a compartment and simultaneously forming slits between said recesses and short of the longitudinal edges of the layer to insure adequate free material to form the recesses and to compensate for the gathering of the material along the boundaries of the recesses, then sealing the two layers together to form compartments each open at one end at the corresponding longitudinal edge of the packaging layers, then filling the partially formed compartments, and thereafter sealing the layers together to close said open ends and complete the compartments.

Other objects, advantages and results of the invention will be brought out by the following description in conjunction with the accompanying drawings in which FIGURE 1 is a front elevational view of a layer or sheet of the packaging material having the recesses therein complemental to corresponding recesses of another identical layer or sheet to form compartments.

FIGURE 2 is a vertical longitudinal sectional view approximately on the plane of the line 2—2 of FIGURE 1.

FIGURE 3 is a rear elevational view of a strip shown in FIGURE 1.

FIGURE 4 is a front elevational view of a strip of partially completed packages before filling of the compartments, with portions of one of the packaging sheets or layers broken away.

FIGURE 5 is a fragmentary edge view of the package strip approximately on the plane of the line 5—5 of FIGURE 4.

FIGURE 6 is a view similar to FIGURE 4 showing the manner of depositing the material being packaged into the partially completed compartments.

FIGURE 7 is a horizontal sectional view approximately on the plane of the line 7—7 of FIGURE 6.

FIGURE 8 is a front elevational view of the completed strip of packages.

FIGURE 9 is an enlarged transverse vertical sectional view on the plane of the line 9—9 of FIGURE 6.

FIGURE 10 is an enlarged horizontal sectional view on the plane of the line 10—10 of FIGURE 9.

FIGURE 11 is an enlarged fragmentary horizontal sectional view on the plane of the line 11—11 of FIGURE 8.

FIGURE 12 is a perspective view on a reduced scale of one of the packages showing the manner of opening the package.

FIGURE 13 is a view similar to FIGURE 6 showing a modified form of the package strip partially completed.

FIGURE 14 is a view similar to FIGURE 8 of the form of the completed package strip.

FIGURE 15 is an enlarged horizontal sectional view on the plane of the line 15—15 of FIGURE 13.

FIGURE 16 is a similar view on the plane of the line 16—16 of FIGURE 14.

FIGURE 17 is an enlarged transverse vertical sectional view on the plane of the line 17—17 of FIGURE 14.

FIGURE 18 is a view similar to FIGURE 17 showing the manner of opening the package.

Specifically describing the embodiment of the invention illustrated in FIGURES 1 to 12, inclusive, while the invention is directed more particularly to the manner of forming individual packages, it is also contemplated to form a plurality of packages simultaneously and integrally but separably connected together in the form of a strip. The reference characters A and B designate the two complemental layers or sheets of the packaging material, for example aluminum foil, in which have been die pressed a plurality of recesses 1 each complemental to a recess of the other sheet or layer to form a complete package compartment, the sheets or layers having been slitted or weakened along transverse zones between the recesses terminating short of the longitudinal edges of the strip so that as the material is die pressed to form the recesses, the sheets are torn between the recesses as indicated at 2 thereby to insure adequate free material to form the recesses and to compensate for any gathering of the material along the boundaries of the recesses and prevent rupturing of the material in the recess walls.

The two sheets A and B are arranged in superimposed relation to each other with the concave sides of the recesses of one sheet facing the concave sides of the recesses of the other sheet, and the two sheets are sealed together in zones 4 that partially complete a compartment for each package with an open end 5 at one longitudinal edge of the strip providing a filling opening. In accordance with the invention, the abutting surfaces of the two sheets A and B are thermoplastic or coated with a thermoplastic material and the zones 4 include heat sealed and preferably interdigitated portions 4a between which and the recesses 1 the sheets are non-adherent portions 4b that extend to the edges of the sheets outwardly of the openings 5 with the edge portions of the sheets in spaced relation to each other throughout their lengths as shown in FIGURE 7 thereby to provide safety expansion areas wherein portions of the sheets or layers may be spread apart slightly without distortion of the compartment walls and to compensate for expansion of the fluid in the compartments when the compartments are being filled or when pressure is exerted on the compartments during handling of the packages.

The partially formed packages are then filled in any suitable manner. As shown, the open end of each compartment 6 is slipped over the nozzle C of a suitable filling machine which forms a filling opening, the non-adherent portions 4b spreading apart to accommodate the nozzles (FIGURE 6) so that the fluent material being packaged flows from each nozzle into the corresponding compartment as indicated at D in FIGURE 6, the amount of material being predetermined and measured in any suitable known manner. After the desired quantity of material has been deposited in the compartments, the packages are completed by simultaneously sealing and preferably interdigitating the layers or sheets A and B together in zones 7 that partially overlap the zones 4 so as to seal the open ends 5 of the compartments and thereby complete the packages. As shown in FIGURE 8, there remain cold pressed zones 4c in non-adherent contact between the walls of the compartments and the interdigitated portions 4a and 7 that provide both for expansion of the material in the chamber and for compensation for pressure exerted on the walls of the compartments, and also to facilitate the opening of the compartments for the removal of the contents thereof.

One provision for opening of the compartments comprises the scoring or weakening of one or both of the sheets A and B in the cold pressed zones 4c along a line at least partially encircling each compartment as indicated at 8, and a tearing notch 9 formed in one edge of the package strip adjacent to the end of each compartment so that the packaging material may be torn inwardly from the notch 9 and then along these scored lines 8, as shown in FIGURE 12 to permit easy separation of the walls of the compartments and permit easy access to the suppository or other material in the compartment. It will be understood that the individual packages can be separated from the package strip by simply tearing the material strip inwardly from either edge thereof to the torn or weakened portions 2.

A modification of the invention is shown in FIGURES 13 to 18, inclusive, where the package is formed in another manner to facilitate opening thereof. Here one longitudinal edge of one sheet of the packaging material E extends beyond the corresponding edge of the other sheet of the packaging material F as indicated at 10, preferably the longitudinal edge at which the open ends of the partially formed compartments are located. The two sheets are heat sealed together in zones 11 corresponding to the zones 4 hereintofore described so as to partially form the compartments, each zone including a heat sealed interdigitated portion 11a and a cold pressed portion 11b corresponding to portion 4b. The partially formed compartments will be filled in the same manner as hereintofore described with a nozzle C of a filling machine extending into each compartment between the sheets E and F at the open end of the partially formed compartment as shown in FIGURE 13.

After the material has been deposited in the compartments, the unsealed portions of the sheets E and F at the open ends of the compartments are cold pressed and interdigitated in zones 12 that partially overlap the zones 11 to the points designated 13 in FIGURE 14 so as to thereby completely seal the compartments.

The heat sealing of the zones 11a is controlled to the degree of bonding which will permit the two layers to be pulled apart with a peeling action to open the compartments for access to the contents thereof, and the cold pressed interdigitated zones 12 seal the compartments but permit easy separation of the layers or sheets E and F with such a peeling action. To open the packages, the extending portion 10 of the sheet E is grasped between the thumb and finger of one hand as indicated in FIGURE 7 so as to separate the two edge portions of the sheets, after which the corresponding edge portion of the other sheet F is grasped between the thumb and finger of the other hand and the two sheets are peeled apart as shown in FIGURE 18 to expose the suppository G or other article in the compartment.

As shown in the drawings, the cold pressed zones 4b and 11b are preferably so shaped that they are initially flared outwardly to the open ends of the compartments so that edge portions of the packaging sheets can be easily separated for insertion of the filling nozzles C as best shown, for example in FIGURES 6 and 9, and the final closing operation, that is, the formation of the sealing zones 7 and 12, forces the cold pressed portions 4b and 11b from the positions shown in FIGURES 10 and 15 to the positions shown in FIGURES 11 and 16 to expel air from the compartments as the open ends of the compartments are closed and insure that the compartments shall be completely filled with the liquid and devoid of air pockets.

I claim:

1. The method of making packages consisting of forming identical recesses in two strips of ductile material, bringing said strips into contact with each other with each recess of each strip facing one recess of the other strip and sealing the strips together in zones each extending in partially surrounding relation to one of said recesses between the recesses and between one end of each recess and the corresponding edges of both strips while maintaining portions of said strips in non-adherent relation in zones disposed between said recesses and said sealed zones and extending to the other edges of said strips and gradually widening from said sealed zones to the second-mentioned edges of the strips, thereby forming a package compartment and a filling opening therefor between said non-adherent portions of the strips.

2. The method as defined in claim 1 with the additional steps of filling said compartment through said filling opening, and thereafter sealing said non-adherent portions of said strips together in zones extending from the first-mentioned sealed zones to the recesses and around and closing the open end of the compartment to complete the package.

3. The method of making packages consisting of forming identical recesses in two strips of ductile material, bringing said strips into contact with each other with the recess of each strip facing the recess of the other strip and sealing the strips together in a zone extending in partially surrounding relation to said recesses between one end thereof and the corresponding edges of the strips while maintaining portions of said strips in non-adherent relation in zones between said recesses and said sealed zones and extending to the other edges of said strips, thereby forming a package compartment, spreading apart the edges of said non-adherent portions of the strips, and inserting a nozzle of a filling machine between the said non-adherent zones and filling said compartment, and thereafter sealing sheets together from the first mentioned sealed zones to the recesses and around and closing said open ends of the compartment.

References Cited in the file of this patent

UNITED STATES PATENTS

| | | |
|---|---|---|
| 2,234,655 | Salfisberg | Mar. 31, 1941 |
| 2,358,246 | Nicolle | Sept. 12, 1944 |
| 2,420,983 | Salfisberg | May 20, 1947 |
| 2,578,445 | Nicolle | Dec. 11, 1951 |
| 2,584,632 | Southwick | Feb. 5, 1952 |
| 2,691,259 | Weckesser | Oct. 12, 1954 |
| 2,718,105 | Ferguson | Sept. 20, 1955 |
| 2,826,020 | Hoag | Mar. 11, 1958 |
| 2,879,635 | Brock | Mar. 31, 1959 |
| 2,913,861 | Macneale | Nov. 24, 1959 |

FOREIGN PATENTS

| | | |
|---|---|---|
| 1,067,307 | France | June 15, 1954 |
| 780,291 | Great Britain | July 31, 1957 |